(12) United States Patent
Yellick et al.

(10) Patent No.: US 12,333,535 B2
(45) Date of Patent: Jun. 17, 2025

(54) PRE-VALIDATED EVENT PROCESSING IN A DECENTRALIZED DATABASE

(71) Applicant: International Business Machines Corporation, Armonk, NY (US)

(72) Inventors: Jason Karl Yellick, Raleigh, NC (US); Alessandro Sorniotti, Rueschlikon (CH); Elli Androulaki, Zürich (CH); Angelo De Caro, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 16/917,247

(22) Filed: Jun. 30, 2020

(65) Prior Publication Data

US 2021/0406876 A1 Dec. 30, 2021

(51) Int. Cl.
*G06Q 20/38* (2012.01)
*G06F 16/23* (2019.01)

(52) U.S. Cl.
CPC ....... *G06Q 20/389* (2013.01); *G06F 16/2379* (2019.01)

(58) Field of Classification Search
USPC ......................................................... 705/44
See application file for complete search history.

(56) References Cited

U.S. PATENT DOCUMENTS

| | | | | |
|---|---|---|---|---|
| 10,585,882 B1* | 3/2020 | Lintilhac | ............... | G06F 16/219 |
| 11,244,313 B2* | 2/2022 | Padmanabhan | ....... | H04L 9/3239 |
| 2015/0379510 A1* | 12/2015 | Smith | ..................... | G06F 21/64 |
| | | | | 705/71 |
| 2017/0206522 A1* | 7/2017 | Schiatti | .................. | G06Q 30/00 |
| 2018/0253702 A1* | 9/2018 | Dowding | ............. | H04L 63/123 |
| 2019/0362361 A1* | 11/2019 | Irazabal | .................... | H04L 9/50 |
| 2020/0089791 A1 | 3/2020 | Raman et al. | | |
| 2020/0092082 A1 | 3/2020 | Raman et al. | | |
| 2020/0092086 A1 | 3/2020 | Raman et al. | | |
| 2020/0112432 A1* | 4/2020 | Iwama | .................... | H04L 63/12 |
| 2020/0142693 A1 | 5/2020 | Neugschwandtner et al. | | |
| 2020/0151686 A1* | 5/2020 | Komandur | .......... | G06F 16/2315 |
| 2020/0184548 A1* | 6/2020 | Rao | ..................... | G06Q 30/0645 |
| 2020/0250661 A1* | 8/2020 | Padmanabhan | ...... | G06Q 20/367 |
| 2021/0056095 A1* | 2/2021 | Srivastava | .......... | G06F 16/2379 |

OTHER PUBLICATIONS

Title: Endorsement in Hyperledger Fabric via service discovery Authors: Y. Manevich et al. Publisher: IBM Date: Feb. 20, 2019 (Year: 2019).*

(Continued)

*Primary Examiner* — Gregory S Cunningham
*Assistant Examiner* — Yongsik Park
(74) *Attorney, Agent, or Firm* — CHIP LAW GROUP

(57) ABSTRACT

An example operation includes one or more of receiving event data from an entity, determining the event data satisfies an endorsement policy, setting an identifier that corresponds to a context of the event data, generating an event which includes the event data and the identifier, and submitting the event for recording in a decentralized database, wherein the identifier is used to validate that a state corresponding to the context in the event data is correct.

20 Claims, 21 Drawing Sheets

(56) References Cited

OTHER PUBLICATIONS

Androulaki et al., (Apr. 2018). Hyperledger fabric: a distributed operating system for permissioned blockchains. In Proceedings of the Thirteenth EuroSys Conference (pp. 1-15).
Anonymous, TradeLens (Feb. 2019). Setting trade free with permissions. Retrieved from https://www.tradelens.com/post/setting-trade-free-with-permissions.
Franke et al., (2020). Designing a Blockchain Model for the Paris Agreement's Carbon Market Mechanism. Sustainability, 12(3), 1068.
Zhang et al. (2018). FHIRChain: applying blockchain to securely and scalably share clinical data. Computational and structural biotechnology journal, 16, 267-278.
Zubaydi et al., (2019). A review on the role of blockchain technology in the healthcare domain. Electronics, 8(6), 679.
Examination Report No. 1 for standard Australian patent application No. 2021300620, mailed on Aug. 29, 2023.
Ichino, et al., "An efficient authentication method of Internet of Things using smart contract, Proceedings of 2020 Symposium on Cryptography and Information Security", The Institute of Electronics, Information and Communication Engineers, Jan. 21, 2021, pp. 1-7.
International Searching Authority, Notification of Transmittal of the International Search Report and the Written Opinion of the International Searching Authority, Aug. 24, 2021, 7 pages, International Application No. IB2021/054257.
The Japan Patent Office, "Notice of Reasons for Refusal", Oct. 29, 2024, 4 pages, Japanese Application No. 2022-571219.
Intellectual Property India, "Hearing notice", Feb. 12, 2025, 2 Pages, IN Application No. 202247069193.

* cited by examiner

Event/Transaction Format
195

First Field
196

Second Field
(Key Information)
197

Third Field
198

PRE-VALIDATED EVENT PROCESSING IN A DECENTRALIZED DATABASE

BACKGROUND

A centralized database stores and maintains data in a single database (e.g., a database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

SUMMARY

One example embodiment provides a system that includes one or more of a receiver to receive event data from an entity, a storage area to store chaincode of a smart contract, and a processor to execute the smart contract to perform one or more of determine that the event data satisfies an endorsement policy, set an identifier that corresponds to a context of the event data, generate an event which includes the event data and the identifier, and submit the event to record in a decentralized database, wherein the identifier validates that a state in correspondence with the context in the event data is correct.

Another example embodiment provides a method that includes one or more of receiving event data from an entity, determining the event data satisfies an endorsement policy, setting an identifier that corresponds to a context of the event data, generating an event which includes the event data and the identifier, and submitting the event for recording in a decentralized database, wherein the identifier is used to validate that a state corresponding to the context in the event data is correct.

A further example embodiment provides a non-transitory computer readable medium comprising instructions, that when read by a processor, cause the processor to perform one or more of receive event data from an entity, determine the event data satisfies an endorsement policy, set an identifier that corresponds to a context of the event data, generate an event which includes the event data and the identifier, and submit the event for recording in a decentralized database, wherein the identifier validates that a state corresponding to the context in the event data is correct.

BRIEF DESCRIPTION OF THE DRAWINGS

FIG. 1C illustrates a further network diagram of a component operating with a database, according to example embodiments

DETAILED DESCRIPTION

Figure 1A:
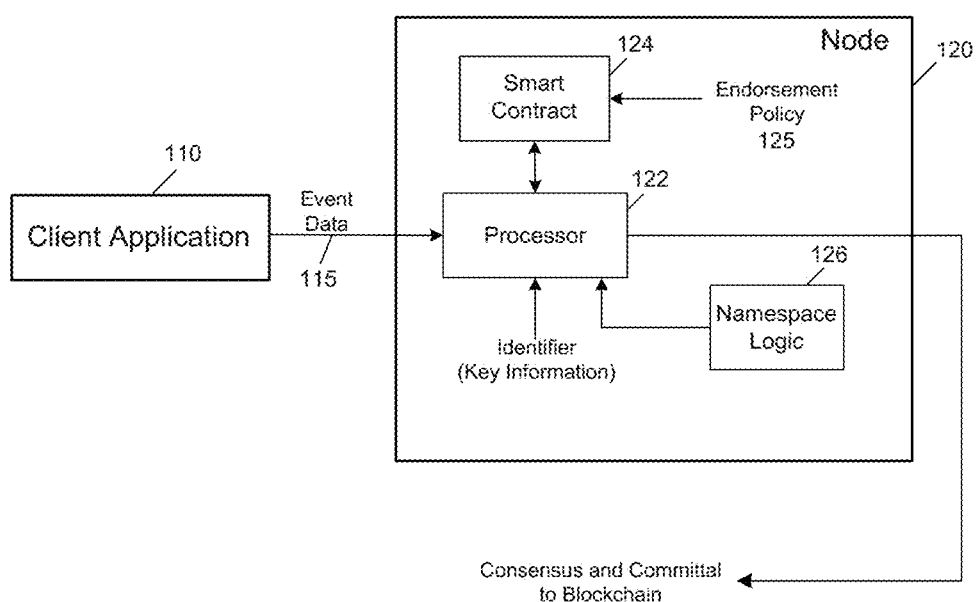
FIG. 1A illustrates a network diagram of a system including a database, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, other types of network data, such as, a packet, frame, datagram, etc. may also be used. Furthermore, while certain types of messages and signaling may be depicted in exemplary embodiments they are not limited to a certain type of message and signaling In one embodiment the application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native crypto-currency and use consensus based on various protocols such as Proof of Work (PoW). Conversely, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser. An ordering-service-node or orderer is a node running the communication service for all nodes, and which implements a delivery guarantee, such as a broadcast to each of the peer nodes in the system when committing transactions and modifying a world state of the blockchain. The world state can constitute the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log and can therefore be regenerated from the chain at any time. The state database may automatically be recovered (or generated if needed) upon peer node startup, and before transactions are accepted.

An event is one type of message transmitted in blockchain networks and other types of decentralized databases. An event may be created by a validator using chaincode of a smart contract when specific conditions are met. One type of event, often referred to as a base event, may be created, for example, when a new block of transactions is to be committed to a blockchain. Other types of events may constitute a part or indicate a state of chaincode. For example, a custom event may relate to certain messages the chaincode has designated for distribution to entities (e.g., nodes, users, clients, etc.) inside or outside the network. It is not uncommon for the events of a network to have varying levels of privacy, access, or restriction as determined, for example, by their validators and/or network policy. Different chaincode may be used to manage the creation, distribution, and/or access of events that have different status levels.

Example embodiments provide methods, systems, components, non-transitory computer readable media, devices, and/or networks, which generate and validate an event prior to the event being stored in a decentralized database, such as but not limited to a blockchain. The event generation and validation is performed in a way that improves the functioning of a computer in managing blockchain information and assets. In one embodiment, the improvement is realized through the addition of a new information stored in association with an event that binds the event (and, for example, one or more associated transactions) to an object and/or namespace managed by the database. The new information may be, for example, key information such as, but not limited to, a key name or a key address.

By performing operations based on the new information, prior to committing the event to the database and/or in connection with a database query relating to the event, validation of the event may be performed along with the associated transaction in a manner that is comparatively more time and processing efficient. In one embodiment, the key information is pre-validated in relation to an object or event. Thus, including the key information with an event (and, for example, one or more attendant transactions) to be recorded in the blockchain or other database serves to automatically validate the event (and transaction(s)) when present in a field associated with the event. In one embodiment, such a field may be included in or appended to an event. In this or another embodiment, a transaction associated with the event may include a message format that includes the field, as well as event data. Thus, checking for the presence of valid key information (e.g., matching known key information) serves to validate the event and its attendant transaction(s), without having to query the ledgers of other nodes in the database to perform validation.

In one embodiment, operations are performed to correlate an event to a pseudo-write in the state namespace. When defining the event, the event may include key information establishing the validity of producing the event. When the event and one or more associated transactions are validated, the event may be evaluated as a pseudo-write of that key information. Even when no state modifications are performed for that key, the validation may ensure that the event and/or the associated transaction would still be valid even if the transaction modified that key information. This has the advantage that consumers of the event (e.g., nodes and/or node clients) may now consider the event to be valid if and only if the event is associated with expected key information. If the key and its access are chosen appropriately, then validity of the event implies validity of the one or more associated transactions.

In addition to the foregoing, some additional benefits of the instant solutions described and depicted herein include, from a security perspective, guarantees to database clients (e.g., consumers in a billing management application) that an event and its transactions and other content are correct, provided the event and its associated transactions/content are appropriately endorsed and assuming that the endorsement policy is appropriately set (e.g., if the endorsement policy is incorrect, no claim can be made on the correctness of any ledger key). With use of the key information and its attendant operations provided by embodiments described herein, if a database user (e.g., through a client application) wanted to attempt to confirm correctness of the event, the user would have to resort to queries after receipt of an event, in order to verify from a sufficient number of peer nodes whether the condition or other content of the event is actually true.

FIG. 1A illustrates a logic diagram of an example embodiment of a system 100 for validating that an event is correct before data corresponding to the event is generated and recorded in a decentralized database. For illustrative purposes, the decentralized database will be discussed as a blockchain. However, a different type of database may be used in another embodiment.

Referring to FIG. 1A, the system 100 includes a network entity such as a node (N1) 120 that is coupled to a client (or client application) 110. The client 110 may generate event data 115 that is transmitted to the node 120 over a communications link, which, for example, may include a wired or wireless network or other communication path. The event data may include information of any form, but may particularly relate to the intended application of the blockchain. In one non-limiting example discussed in greater detail below, the event data include billing information for customers of one or more network entities. In this case, the network entities may belong, for example, to the same company or different companies. In one embodiment, the client 110 may encrypt the event data and/or one or more associated transactions prior to being delivered to the node 120. Corresponding decryption (e.g., key) information may be located at one or more other nodes of the blockchain network or an associated client that may be used to perform decryption to access events, for example, produced from a blockchain query. The node 120 may be one of a plurality of nodes of the decentralized database. In one embodiment, the node 120 may be a peer node that performs event and/or transaction validation prior to committing the event and transaction to the blockchain.

As shown in FIG. 1A, the node 120 includes a processor 122 and a storage area 124 that stores chaincode of a smart contract to be executed by the processor. In operation, the processor receives the event data from the client 110 and then compares the event data to an endorsement policy 125. If the conditions or requirements of the endorsement policy are satisfied, the processor 122 executes chaincode of the smart contract to generate an event. The event alone, or with an associated one or more transactions, may then be submitted for consensus and committal to the blockchain. In one embodiment, each event or associated transaction may relate to the same or different object managed in the blockchain database. In some cases, events and associated transactions may indicate different states of that object. The blockchain, therefore, may store events with associated transactions, where content of each event may represent a different state (or a change of state) of an associated object. In order to generate key information on a namespace basis, node 120 (and indeed one or more other nodes in the blockchain network) may include namespace logic 126.

Figure 1B:
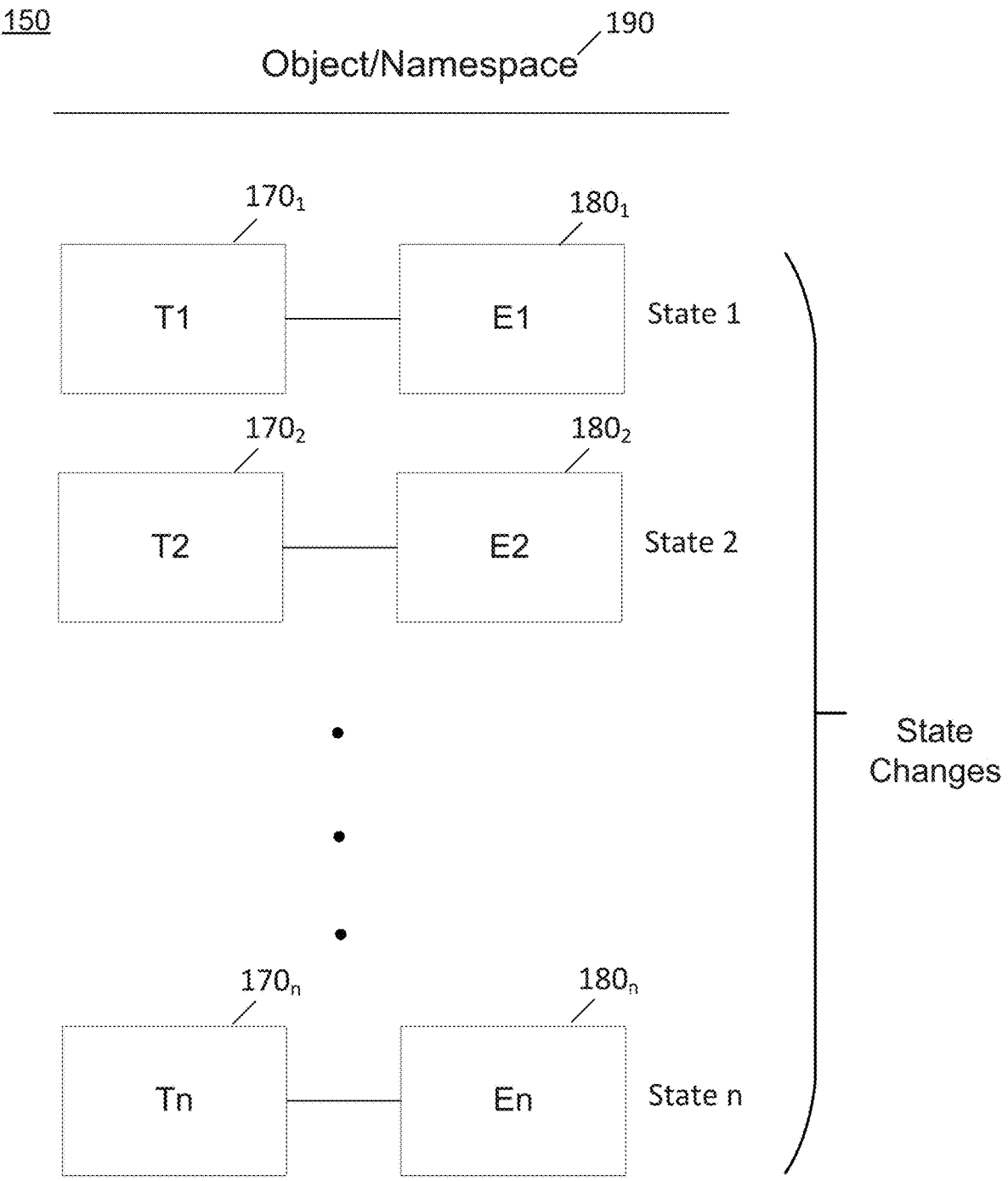
FIG. 1B illustrates another network diagram of a component operating with a database, according to example embodiments.

FIG. 1B illustrates an example of a logical relationship 150 among a series of transactions $170_1$ to $170_N$ that have been recorded in a blockchain over time. In this example, all of the transactions relate to the same object or namespace 190. In a billing application, the object 190 may correspond to the state of a customer bill corresponding to the event data received by the node 120. In this case, the client 110 may be a bank, credit card company, utility company, or another entity that bills for goods and/or services.

Referring to FIG. 1B, one or more of the transactions $170_1$ to $170_N$ may be associated with corresponding events generated by the processor of node 120 based on different items of event data received from the client 110. In this example, an event (E1) $180_1$ corresponds to an associated transaction (T1) $170_1$, an event (E2) $180_2$ corresponds to an associated transaction (T2) $170_2$, and so on. Each event may indicate the state of the object (or its associated transaction). While the events are shown to be distinct from the transactions in FIG. 1B, in one embodiment the events (or event data) may be included in an appended or additional field of a transaction or event format. For example, in one embodiment illustrated in FIG. 1C, the format 195 of each transaction or event may have a message structure which includes a first field 196 containing information indicative of the event data, a second field 197 including event key information that may be used for improved validation in accordance with one or more embodiments described herein, and a third field 198 including transaction information.

One possible relationship between transactions and events may be understood in accordance with the following example. When the object 190 is indicative of a bill for customer X, event (E1) $180_1$ may indicate the state that a bill has been generated for customer X. The associated transaction (T1) $170_1$ may indicate, for example, the amount of the bill. Event (E2) $180_2$ may indicate a different state for the bill. For example, event E2 may indicate the state that the bill has not been paid for a transaction (T2) $170_2$ indicating that the first due date for the bill has expired. One or more subsequent transactions may reflect various additional state changes and associated transactions. For example, even (EN) $180_N$ may indicate that the bill for customer X has been paid and its associated transaction (TN) $170_N$ may indicate that a late fee has been added to the bill. Thus, for the blockchain ledger may record the transactions with associated events for the same object managed by the network.

In one embodiment, the object may be associated with a state namespace of the blockchain network. The namespace may be a partition of the state space which has different validation rules than the smart contract's global namespace, such as private data collections in Hyperledger Fabric. The namespace may even be a single key which has its own validation rules, such a state-based endorsement in Hyperledger Fabric, or tokens in other blockchain systems.

Returning the FIG. 1A, in order to prevent fraud and ensure the validity of the information stored in the blockchain, the chaincode of the smart contract executed processor 122 may generate an event that includes an additional field used for validation, e.g., confirmation that the event is correct or otherwise authentic and valid. This may be performed, for example, by the processor executing chaincode of the smart contract 124 to generate information (e.g., an identifier) that is linked to the object. This identifier may be generated, for example, by a network authority and pre-authorized for use with the object (or a namespace). The identifier, thus, may serve as a basis for validating the event just by being linked to the event, thereby alleviating the need to query the ledgers of the peer nodes in the blockchain in order to determine that the content of the event (and its associated transaction) is correct. In the example event or transaction format of FIG. 1C, the identifier may be included in the second field 197, which is a newly generated field reserved for event validation purposes.

Once the identifier is set (e.g., either by access to pre-stored information or obtained directly from the network authority), the processor 122 may insert the identifier in the second field used for validation. In at least this way, the processor may be considered to perform a pseudo-write operation that involves pre-storing information in a dedicated field of the event (or transaction) that may be used to validate of the event prior to the event being generated for consensus and committing to the blockchain. The generation and insertion (or other association) of the identifier in the event may improve efficiency of the computer managing the blockchain, at least in terms of reducing the processing overhead of peer nodes and the overall managing network entities.

In one embodiment, the information stored in the new second field of the event may be linked to the object with which the event is associated. For example, in one embodiment the generated identifier that is pseudo-written into the second field of the event/transaction may include key information that has been generated in advance for the particular object corresponding to the event. Because the key information has already been validated for the object (e.g., by the network authority), the event (and its associated transaction) may be validated by confirming that the key information is associated with the event. This alleviates the need to query the ledgers of the blockchain nodes to validate the event and its associated transaction prior to committing the transaction to a new block to be appended to the blockchain. Thus, the key information may serve to effectively bind the event to an authorization mechanism or validation authority that is programmed to perform validation or authorization based on the key information. In one embodiment, the key information may include a key name assigned to the object. In another embodiment, the key information may include a key address assigned to the object. In yet another embodiment, the processor may generate a different type of identifying information that is associated with the object for purposes of authorizing the generation of an event based on the event data received by the client 110. They key information may be encoded with one or more security features (e.g., various forms of encryption) before insertion into the additional field of the event or transaction format.

In one embodiment, the chaincode of the smart contract implemented by processor 122 may be programmed to generate key information for event authorization on a namespace basis. Each namespace may have a plurality of corresponding objects that may be different from the objects that correspond to other namespaces, and each of those objects may have one or more corresponding transactions and/or events depending, for example, on the intended application of the blockchain.

In order to generate key information on a namespace basis, node 120 (and indeed one or more other nodes in the blockchain network) may include namespace logic 126. Such logic may be, for example, part of a blockchain platform such as, but not limited to, Hyperledger Sawtooth platform. The namespace logic 126 may be used by node 120 to authorize generation of an event to provide separation among unrelated transactions, e.g., transactions unrelated to the same object. For example, the node 120 may include namespace logic 126 that uses a global state store and that allows the store to be separated into different namespaces, with each namespace corresponding to a separate category of objects. In one non-limiting example, each namespace may correspond to a different customer and the events corresponding to each namespace may correspond to bills issued to those customers.

When node 120 includes namespace logic, different key information may be generated in advance for each object in each namespace. In one embodiment, the same key information may be generated for multiple objects corresponding to a same namespace. In either case, the key information may be pre-validated and authorized for use in association with events and/or transactions corresponding to an associated object. In this way, event authorization may be performed by confirming that the event emitted by node 120 for authorization and subsequent recordation in the blockchain has the appropriate corresponding key information assigned to the object to which the event corresponds. As a result, the inefficient processing of querying ledgers of nodes in the blockchain to perform event authorization may be prevented, thereby improving operation of the computer as it relates to managing event generation, authorization, consensus, and committal of blockchain transactions, and subsequent operations relating to validating the transaction and its associated event when the blockchain is queried by the same or another node.

In accordance with the aforementioned features, node 120 may operate as follows in implementing one or more embodiments described herein. When event data is received from the client 110, the processor 122 emits a new event by additionally setting a new (event validation) field in the event (or transaction format) that includes the key information corresponding to the object and/or the namespace to which the object corresponds. As previously explained, the emitted event may include information indicating a state corresponding to the transaction to which the event is performing a pseudo-write against. The platform validation code (e.g., included in the chaincode of the smart contract) inspects the key information in the new (event validation) field when validating one or more corresponding transactions.

In some cases, the transaction associated with the emitted event may have modified the key information. Nevertheless, storing the key information in the new field ensures that, even when the transaction is modified, the key information (in addition to any of the modifications which this transaction is actually performing) referenced, for example, by the node 120 or platform validation code is still considered valid.

Subsequently, when a client application (e.g., corresponding to client 110, another client of node 120, or a client of another node in the blockchain network) performs a query to retrieve the transaction event from a block in the blockchain, that client application can validate the validity (or correctness) of the transaction event by performing a comparison based on the key information stored in the event validation field of that transaction event. For example, because the client application can obtain, or has recorded, the key information for a particular object (and/or namespace) associated with the retrieved transaction event, the client application may compare the key information stored in the field of the retrieved transaction event to the known key information for that object (or namespace). If there is a match, the client application determines that the transaction event is valid without having to query the legers of the other nodes in the blockchain network. If there is not a match, then the client application may determine that the transaction event that recorded in the blockchain is fraudulent (e.g., from a malicious attacker) or is otherwise untrustworthy.

An example scenario of these embodiments is a billing application. For example, if the smart contract executed by the processor 122 of node 120 were to emit an event indicating a state that a particular bill (object) of a customer has been paid in full, then the event could be augmented with a field referencing key information referencing the bill. In this case, the "bill paid in full" event may only be considered to be valid if the associated transaction (e.g., transfer of funds to pay the bill) is authorized by the customer and/or other parties (e.g., credit card company) with authority to modify the event state of that bill. The validity of the event state may be confirmed based on the key information stored in the additional field of the event (or transaction message format).

In some cases, in the aforementioned example scenario the transaction itself may cause the key information to be modified. For instance, updating the event state of the bill from "unpaid" to "paid in full" may cause modification of a large set of keys, not all of which are easy to predict or require equivalent endorsement for the bill payment to be authorized. However, some of these keys, such as the key representing the bill's paid state must be modified in a valid transaction and must therefore be endorsed by an entity authorized to modify the bill. By binding the event to the key information, the client application retrieving information from the blockchain which seeks to confirm full payment may only need to determine a subset of the state mechanics of the smart contract in node 120 that created the event. This may have the beneficial effect of preserving the privacy and security of the customer information while at the same time allowing the client application to obtain the information it has requested in order to confirm the validity of payment of the bill.

Without the key information, the client application would be required to operate in an insecure manner (without performing event validation altogether) or would at the very least be required to perform time- and processing-inefficient operations in order to validate the event, both prior to committing to the blockchain and during validation after a blockchain query by a client application. For example, the client would have to make a round-trip query of the ledger state to confirm that the event was appropriately generated. Moreover, without the event-key-binding approach of the embodiments described herein, an attacker who has not paid a bill could issue a valid transaction (e.g., perhaps paying an unrelated smaller bill) but attach an event indicating that a different larger bill was paid. When receiving the event, the application could (a) inspect the state modifications of the transaction and attempt to verify that the state modifications correspond to the event contents (this approach is fragile, and error prone), (b) immediately make a return trip to the ledger to ask what the state of the bill was to confirm that the event contents are correct (which is expensive and error prone), or (c) accept the event at face value and be subject to the attack. By introducing the event-binding of the embodiments, the client application may, for example, take approach (c) with an additional validity check performed based on matching key information in the new event field and remain secure.

Figure 2A:
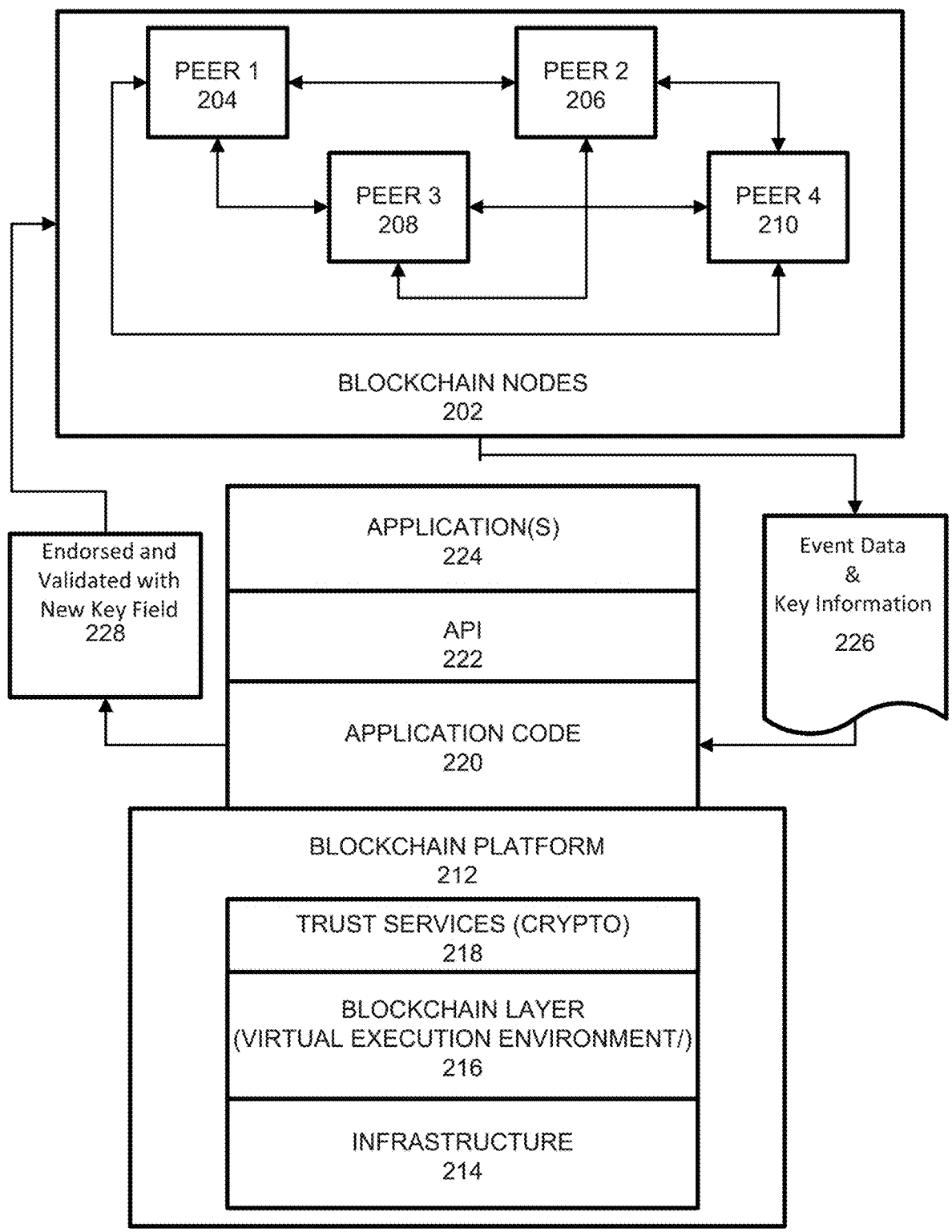
FIG. 2A illustrates an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed, for example, as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions (e.g., asset exchange transactions) and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226 may include event data received from a client application, node, or other network entity. The event data may be used as a basis by the receiving node to generate and validate an event. Event generation and validation may be performed using logic which may include chaincode of a smart contract implemented by the receiving node. The chaincode may be included, for example, in application 224 or may be separate from application 224. The smart contract and/or application 224 may be executed by one or more processing entities (in one case, for example, a virtual machine) included in the blockchain layer 216.

Among other operations, chaincode of the smart contract may generate and validate the event, for example, based on an existing endorsement policy in the database network. In one embodiment, the smart contract may determine a database object (e.g., bill) and/or namespace associated with the received event data. The node may then endorse and validate the event (and any attendant transaction(s)) based on the terms of the endorsement policy. If the conditions are the endorsement and validation are satisfied (which may be different depending, for example, on the content of event data and/or the intended application of the database), the node may digitally sign the event and authorize it to be emitted throughout the network, for example, including it being committed to the blockchain.

In one embodiment, endorsement may be predicated on the event data being associated with an object or predetermined namespace managed by the database network. For example, the smart contract of the node receiving the event data may check the content of the data against known objects and/or namespaces managed by the network. If there is a match, the smart contract may retrieve key information stored in association with that object or namespace and then generate a corresponding event including a new field for storing the key information. Including the key information with the event guarantees that the content of the event (including, for example, any state change or transaction associate with the event) is correct and valid.

The result 228 may include the now-endorsed and validated event with the new field including the key information generated by the smart contract. The event may be output with or without one or more associated transactions. This event (and association transaction(s)) may be output to the blockchain network for consensus and subsequent committing to a new block in the blockchain. In one embodiment, the event may be sent as a notification to other nodes in the blockchain network. Once committed to the blockchain, client applications communicating with the nodes (e.g., peer nodes 204, 206, 208, 210, etc.) may query the blockchain for the event. The key information included in the new field may therefore serve to automatically validate that the content of the event and any associated transactions are correct. The physical infrastructure 214 may be utilized to retrieve any of the data or information described herein.

The smart contracts described herein may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature or context extractor. If the hashes of the hash identifier and the hash created from the stored identifier template data match, then the chaincode sends an authorization key to the requested service. The chaincode may write to the blockchain data associated with the cryptographic details.

Figure 2B:
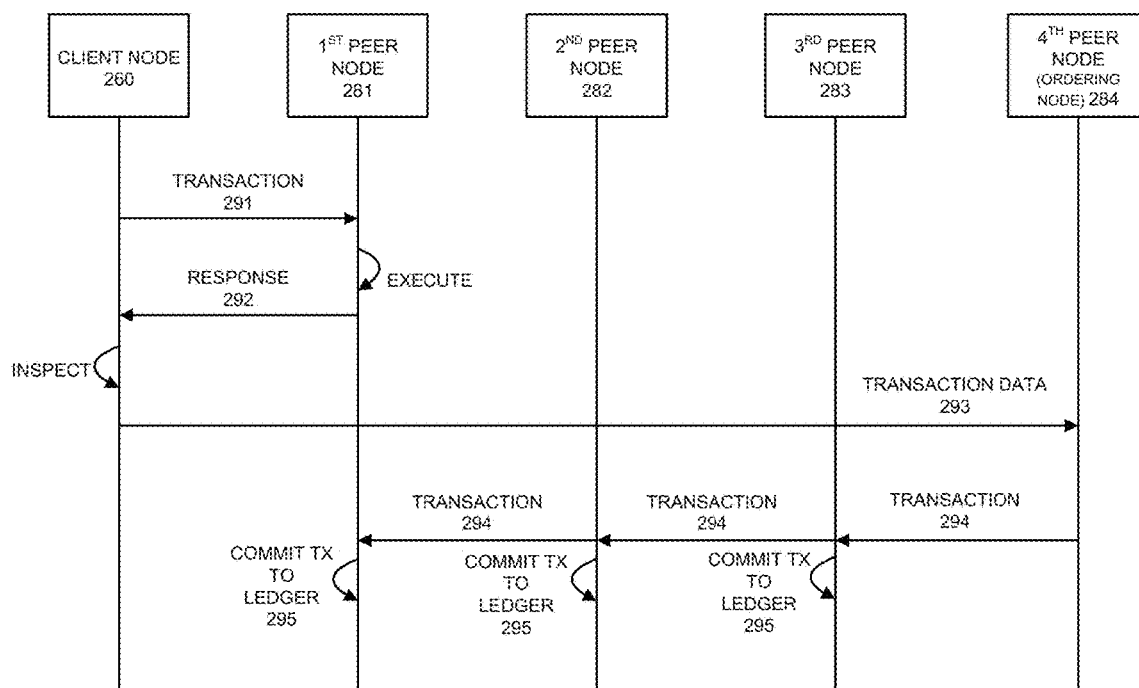
FIG. 2B illustrates a blockchain transactional flow, according to example embodiments.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers' signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers' signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3A:
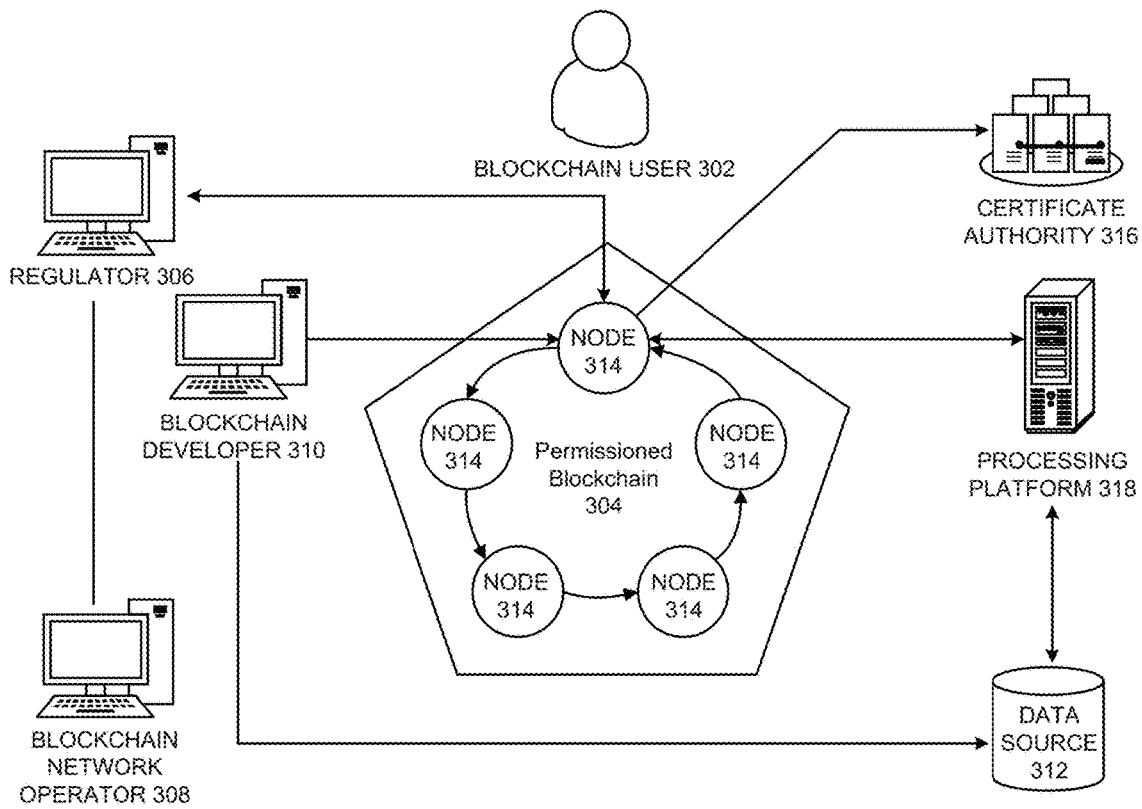
FIG. 3A illustrates a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 16, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
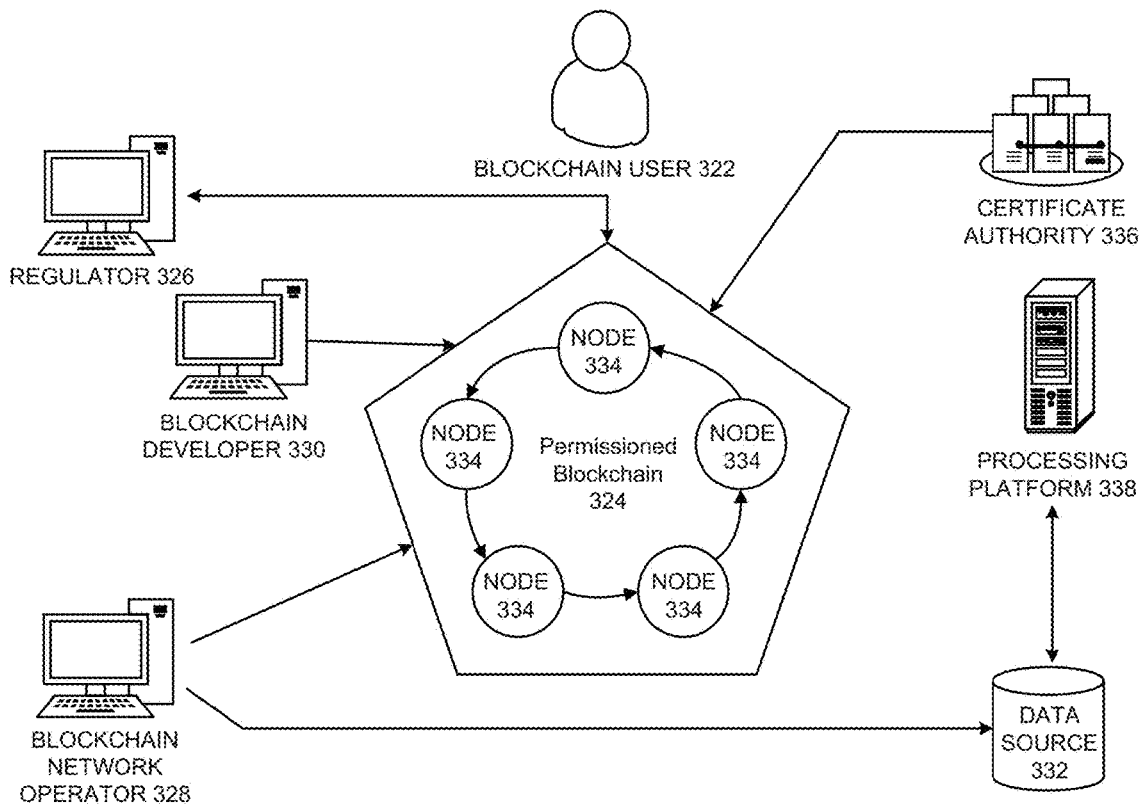
FIG. 3B illustrates another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
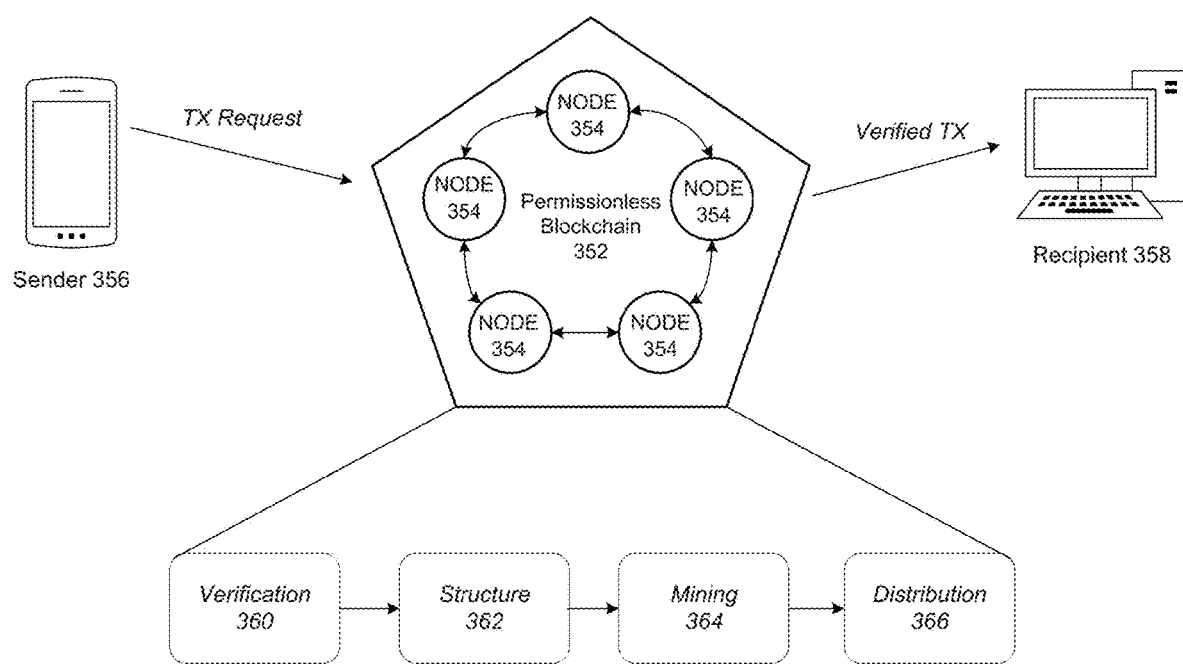
FIG. 3C illustrates a permissionless network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain 352 network parameters the nodes verify 360 the transaction based on rules (which may be predefined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain which is the permissionless blockchain 352 auditable ledger. Furthermore, the value in the transaction submitted by the sender 356 is deposited or otherwise transferred to the digital wallet of the recipient device 358.

Figure 4:
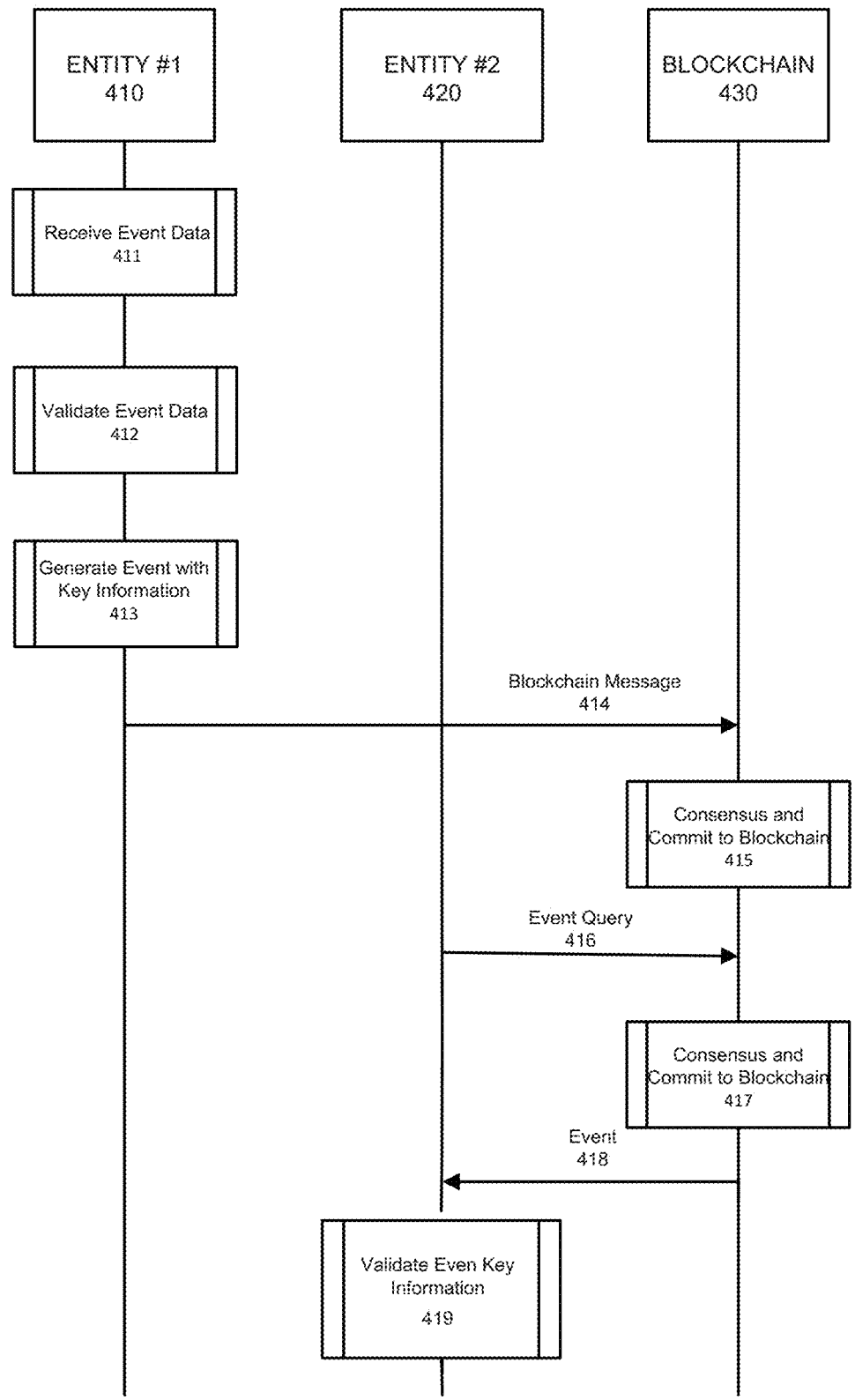
FIG. 4 illustrates a system messaging diagram, according to example embodiments.

FIG. 4 illustrates a system messaging diagram 400 for generating and validating an event according to example embodiments. Referring to FIG. 4, the system diagram 400 includes a first entity 410, a second entity 420, and a blockchain 430. The first entity 410 may be a first node and the second entity 420 may be a second node of the blockchain network.

Referring to FIG. 4, the messaging diagram includes receiving a first message 411 that includes event data for consideration in generating a new event. The first message may be received from a client application communicating with the first entity 410, another node of the blockchain network, or another entity. The event data may include content which identifies, or provides information that may be used as a basis for identifying, an object and/or namespace of the blockchain network. In one embodiment, the content of the event data may indicate a state (or change of state) of an associated object, e.g., for the object of a bill to a particular customer of a company, the event data may indicate that the state of the bill has changed from a state of "unpaid" to a state of "paid in full."

In operation 412, once the first message is received, a processor of the first entity 410 executes a smart contract to determine the content of the first message. The content is them submitted to an endorsement policy, which may define a set of conditions or operations that are to be performed in endorsing and validating the event data, in order to determine whether an event should be generated in the network. The conditions or operations may include determining whether the object indicated by the message content corresponds to key information previously generated and maintained by the blockchain network. In addition, or alternatively, a processor of the first entity may determine whether there is a predetermined namespace corresponding to the content of the event data. If neither condition exists, then the event data may not be validated and generation of an event may be rejected. On the other hand, if the conditions of the endorsement policy have been satisfied, an event may be generated.

In operation 413, once the determination has been made that the conditions of the endorsement policy have been satisfied, the processor executing the smart contract of the first entity 410 generates an event with a new field storing key information corresponding to the object and/or namespace relating to the event data. This operation may be performed in a variety of ways. For example, the generated event may include the new field with the key information. Additionally, or alternatively, the message format of a transaction associated with the event may include the new field including the key information.

A message 414 is sent to the blockchain 430 once the event has been created. The message may be sent with the event and one or more associated transactions, if they exist. Once received, the blockchain submits the event for consensus and then commits the event in a new block in the blockchain, at operation 415.

A message 416 may then be sent from the second entity 420 to the blockchain 430 at any point after the event has been committed to the blockchain. The message 416 may include a query to access event and its attendant transaction(s).

In operation 417, the block containing the event is retrieved from the blockchain and sent back to the second entity 420 in a reply message 418.

In operation 419, the second entity 420 searches the content of the event retrieved from the blockchain and retrieves the key information. This key information is then compared to known key information of the object (and/or namespace) corresponding to the content of the event. If there is a match, then the second entity 420 may determine that the event is valid, along with any transactions associated with the event as identified in the information retrieved from the blockchain 430. These operations may be performed, for example, by a smart contract executed by a processor of the second entity 420.

Figure 5:
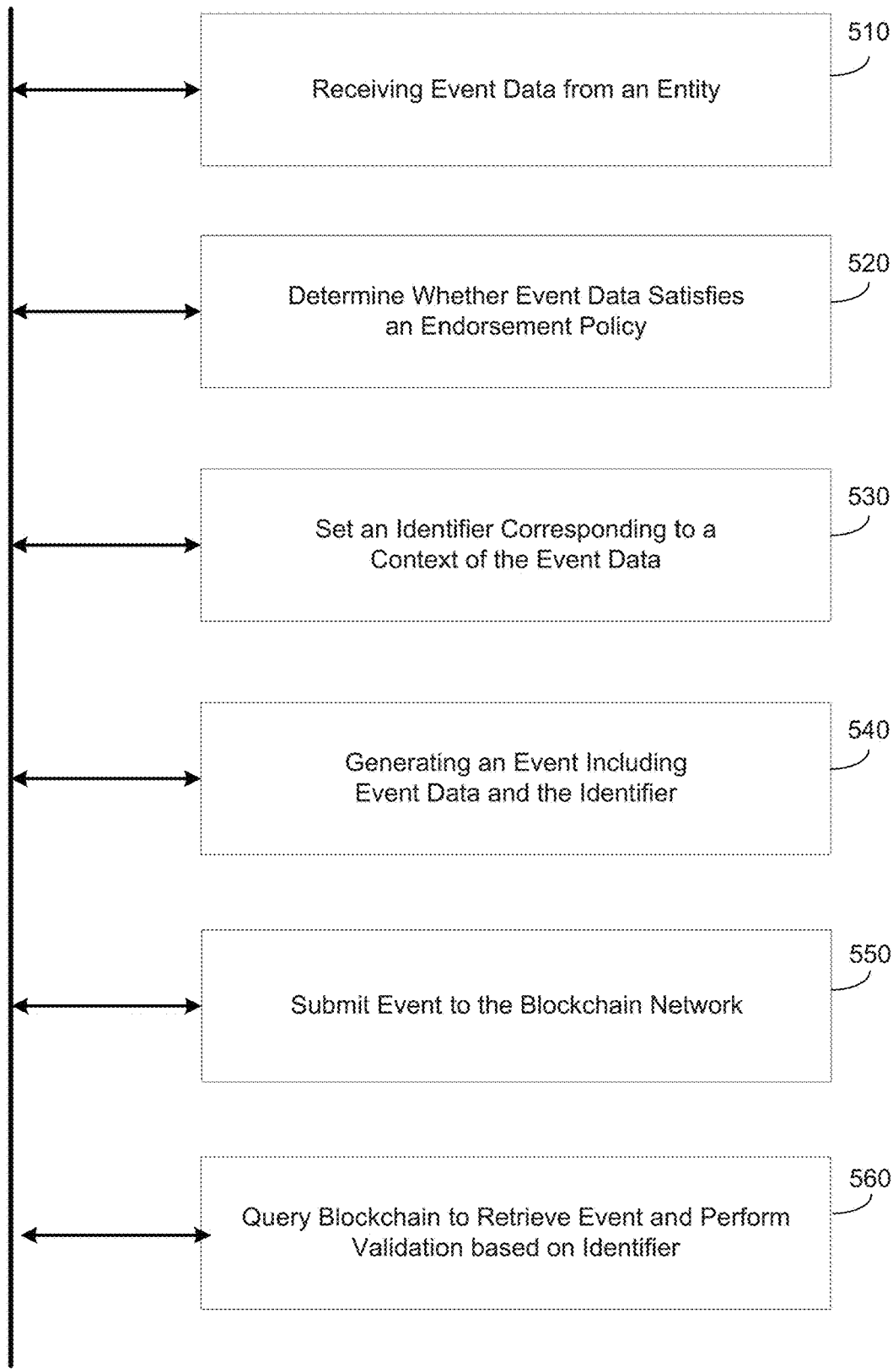
FIG. 5 illustrates a flow diagram, according to example embodiments.

FIG. 5 illustrates a flow diagram 500 of an example method of managing information in a decentralized database such as blockchain, according to example embodiments. Referring to FIG. 5, the method 500 may include, at 510, receiving event data from an entity. The content of the event data may include various types of information indicative of an event to be generated and recorded in the blockchain. The entity may be a client application of a blockchain node, a node in the blockchain, another blockchain entity, or an entity external to the blockchain network but in communication with one or more entities of the network.

At 520, a determination is made as to whether the event data satisfies an endorsement policy. The endorsement policy may include one or more requirements or conditions as described herein. In one embodiment, the endorsement policy may require the content of the event data to correspond to one or more of an object managed by the blockchain or a namespace of the blockchain. In a billing application, for example, the object may be a particular bill and the event data may indicate a transaction relating to the bill. For example, the event data may indicate that a state change concerning the bill has occurred, e.g., change from "unpaid" to "paid in full." The namespace may, for example, correspond to a customer of the company or service that issued the bill and/or which provided services or goods relating to the bill.

At 530, an identifier is set that corresponds to a context of the event data. The context of the event data may be or include, for example, the object or namespace previously indicated. In one embodiment, the identifier may include any of the types of key information described herein. For example, the context of the event data may include a tuple that includes all or any two or more of a channel name, namespace, collection, or key name corresponding to the database. The key information may, for example, be set in advance to correspond to the object or namespace. Thus, association of the key information with the event and/or one or more associated transactions may serve to automatically validate that the event is correct.

At 540, once the endorsement policy has been satisfied and the identifier set, the method may include generating an event for submission to the blockchain network. The generated event may include, for example, a number of fields. One field may include information obtained from the event data that is indicative of a state, object, namespace, or context managed by the database. Another field may include the identifier, e.g., key information predetermined for the object, namespace, or other context.

At 550, the generated event may be submitted to the blockchain network. This may involve committing the event for consensus and subject recordation in a new block to be recorded in the blockchain. In one embodiment, this may include providing notification to peer nodes in the blockchain network of the event, irrespective of whether the event is recorded in the blockchain.

At 560, the blockchain may be queried to retrieve the event and validation that the content of the retrieved event may be confirmed by matching the key information in the retrieved event to known key information that has been pre-authorized and linked to the object or namespace associated with the content of the event.

Figure 6A:
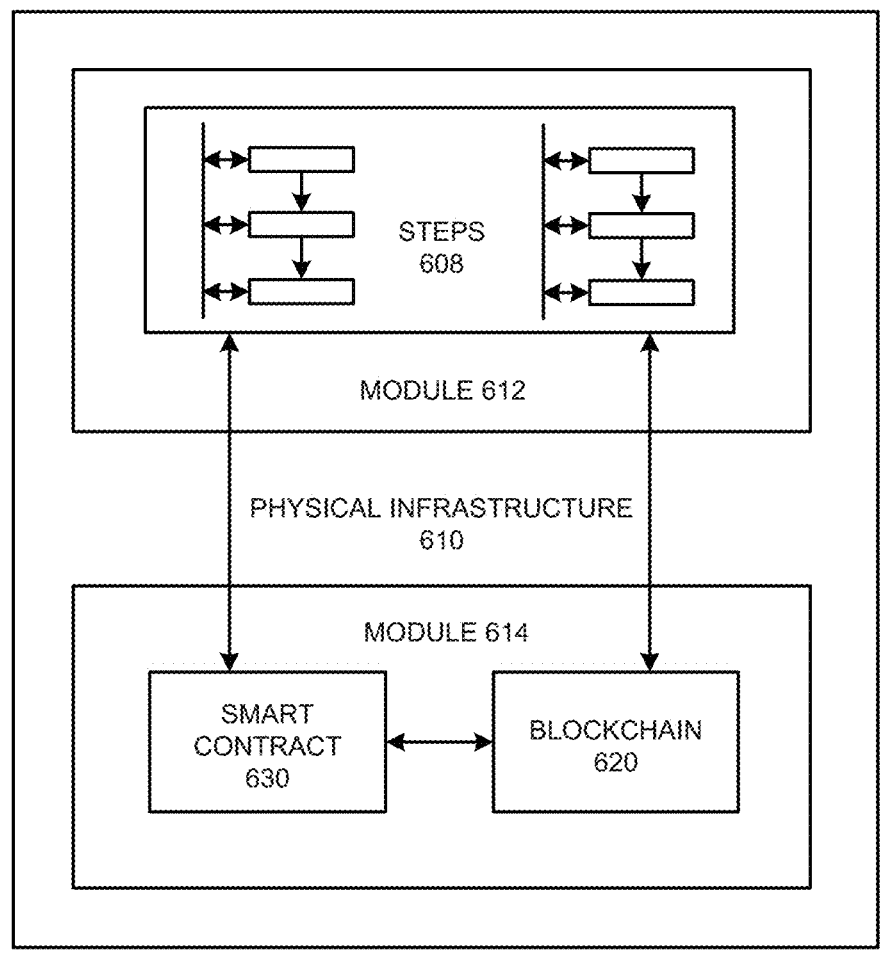
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
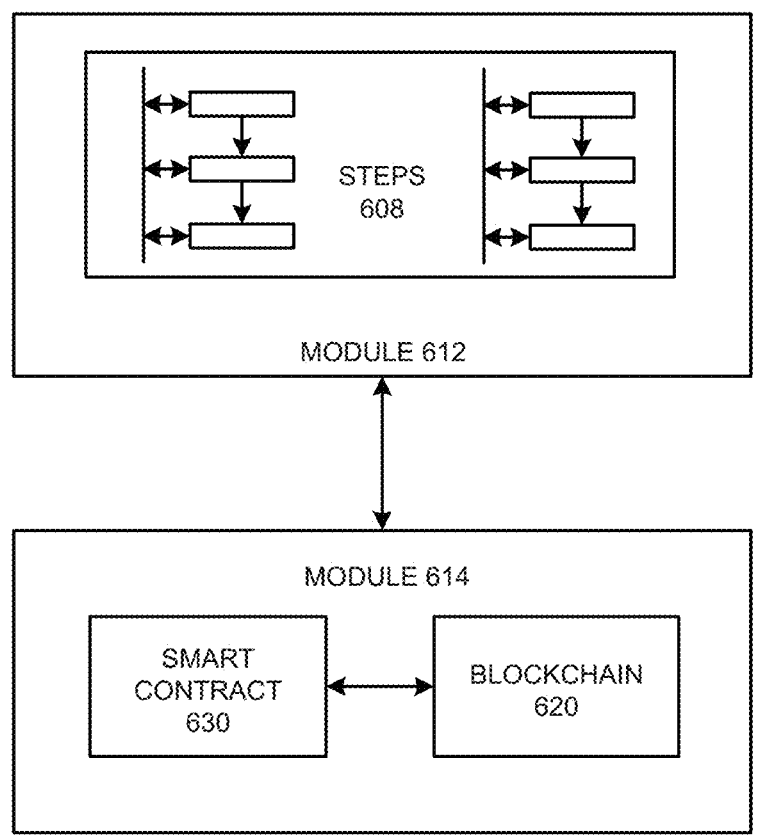
FIG. 6B illustrates another example system configured to perform one or more operations described herein, according to example embodiments.

FIG. 6B illustrates another example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The module 612, and the module 614 may include one or more computers, servers, processors, memories, and/or wireless communication devices. Further, the module 612 and the module 614 may be a same module.

Figure 6C:
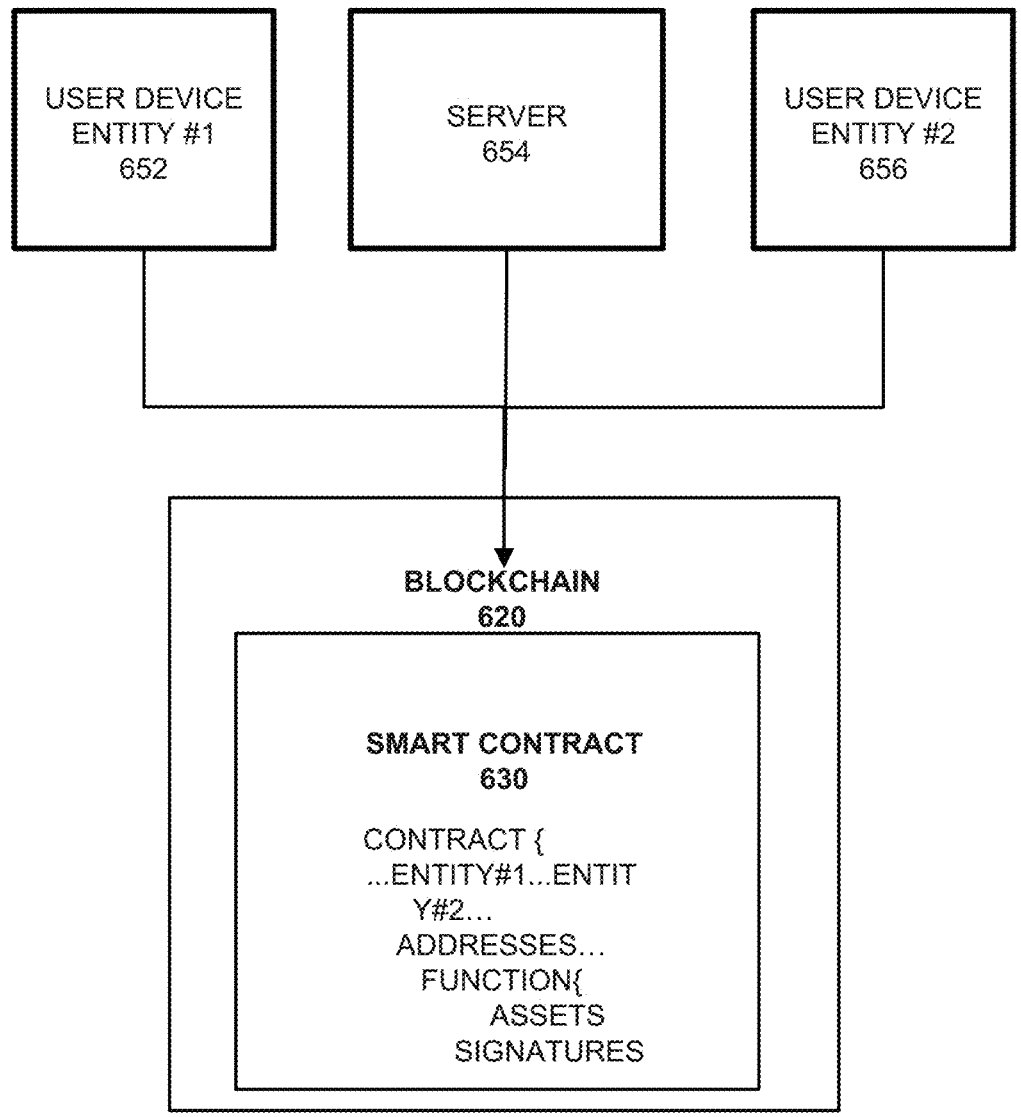
FIG. 6C illustrates a further example system configured to utilize a smart contract, according to example embodiments.

FIG. 6C illustrates an example system configured to utilize a smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
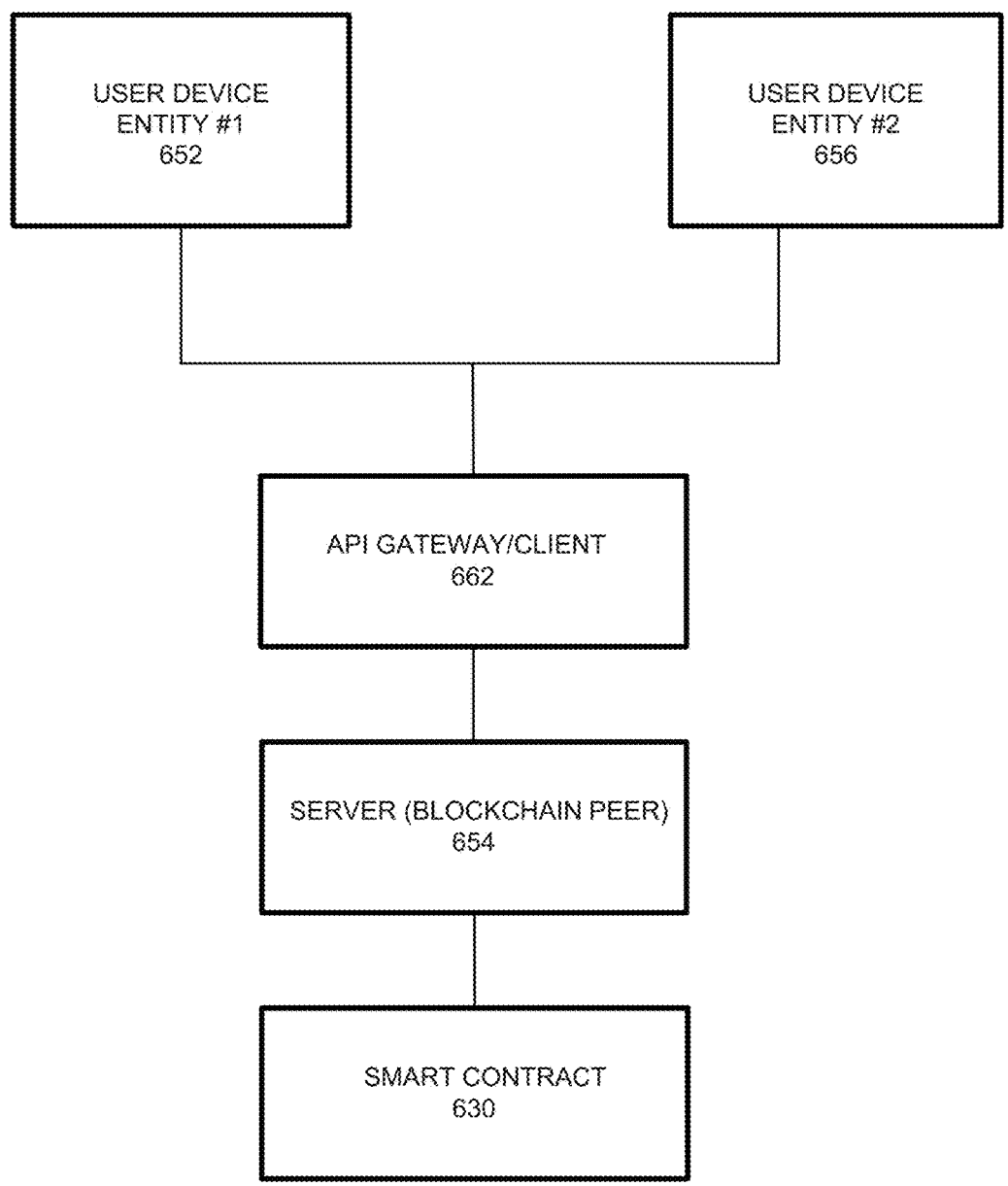
FIG. 6D illustrates yet another example system configured to utilize a blockchain, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
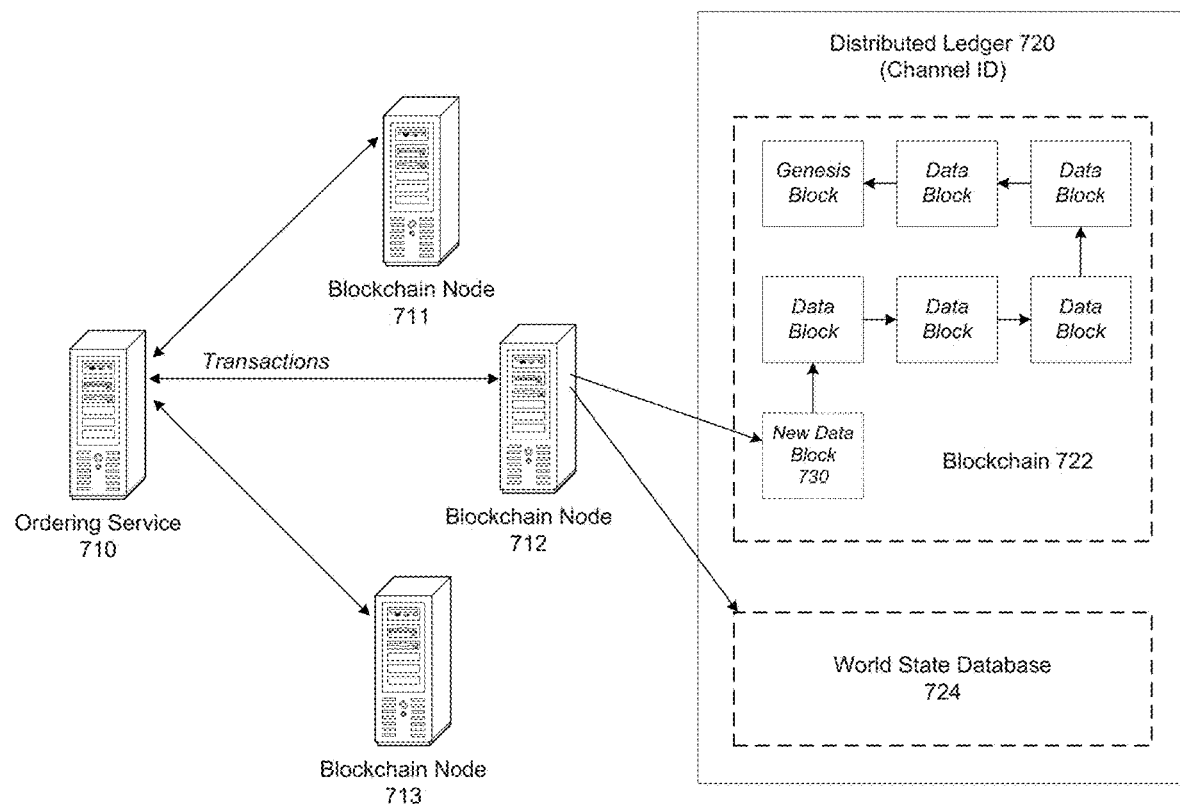
FIG. 7A illustrates a process for a new block being added to a distributed ledger, according to example embodiments.
Figure 7B:
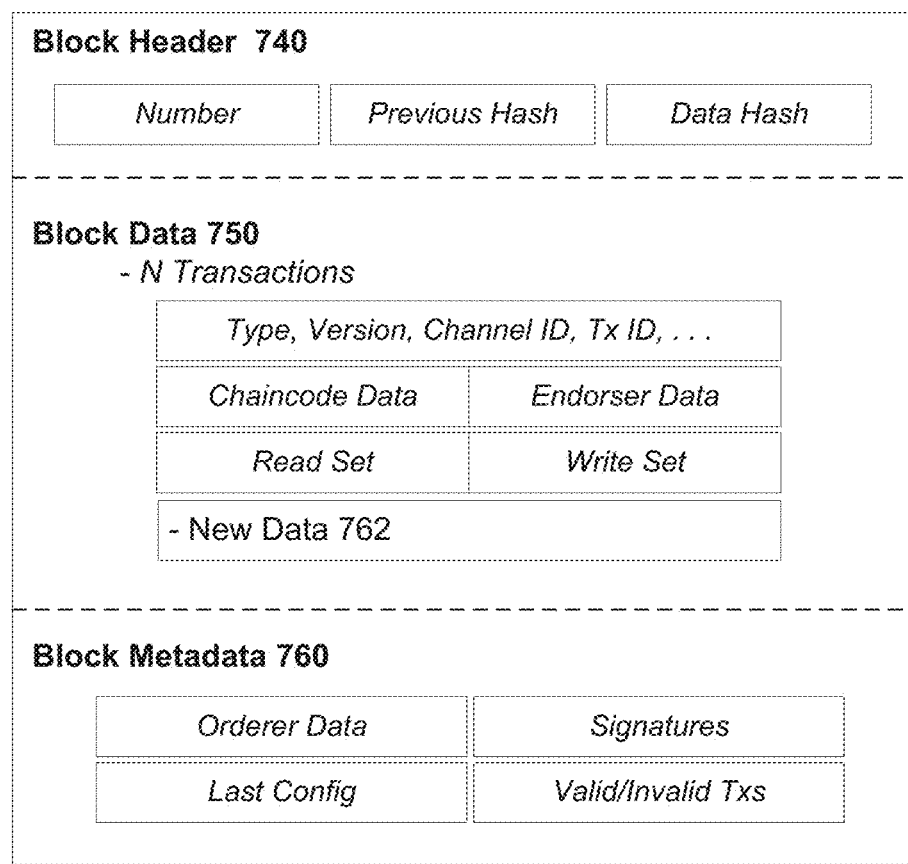
FIG. 7B illustrates contents of a new data block, according to example embodiments.

FIG. 7A illustrates a process 700 of a new block being added to a distributed ledger 720, according to example embodiments, and FIG. 7B illustrates contents of a new data block structure 730 for blockchain, according to example embodiments. Referring to FIG. 7A, clients (not shown) may submit transactions to blockchain nodes 711, 712, and/or 713. Clients may be instructions received from any source to enact activity on the blockchain 720. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/ peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 722 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 720. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750, and block metadata 760. It should be appreciated that the various depicted blocks and their contents, such as new data block 730 and its contents. Shown in FIG. 7B are merely examples and are not meant to limit the scope of the example embodiments. The new data block 730 may store transactional information of N transaction(s) (e.g., 1, 10, 100, 500, 1000, 2000, 3000, etc.) within the block data 750. The new data block 730 may also include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

The block data 750 may store transactional information of each transaction that is recorded within the new data block 730. For example, the transaction data may include one or more of a type of the transaction, a version, a timestamp, a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 750 may also store new data 762 which adds additional information to the hash-linked chain of blocks in the blockchain 722. The additional information includes one or more of the steps, features, processes and/or actions described or depicted herein. Accordingly, the new data 762 can be stored in an immutable log of blocks on the distributed ledger 720. Some of the benefits of storing such new data 762 are reflected in the various embodiments disclosed and depicted herein. Although in FIG. 7B the new data 762 is depicted in the block data 750 but could also be located in the block header 740 or the block metadata 760.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions in the block data 750 and a validation code identifying whether a transaction was valid/invalid.

Figure 7C:
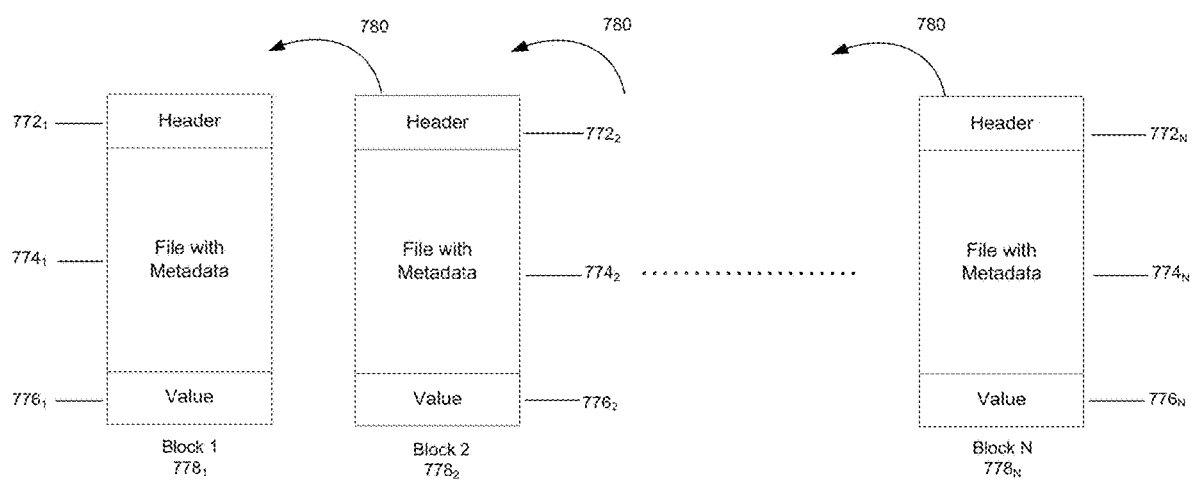
FIG. 7C illustrates a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block ma y be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 7C, the blockchain 770 includes a number of blocks $778_1$, $778_2$, . . . $778_N$ cryptographically linked in an ordered sequence, where N≥1. The encryption used to link the blocks $778_1$, $778_2$, . . . $778_N$ may be any of a number of keyed or un-keyed Hash functions. In one embodiment, the blocks $778_1$, $778_2$, . . . $778_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $778_1$, $778_2$, . . . , $778_N$ may be cryptographically linked by a function that is different from a hash function. For purposes of illustration, the following description is made with reference to a hash function, e.g., SHA-2.

Each of the blocks $778_1$, $778_2$, . . . , $778_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $778_1$ in the blockchain is referred to as the genesis block and includes the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant. Unlike the header in other blocks $778_2$ to $778_N$ in the blockchain, the header $772_1$ in the genesis block does not reference a previous block, simply because there is no previous block.

The original file $774_1$ in the genesis block may be, for example, data as captured by a device with or without processing prior to its inclusion in the blockchain. The original file $774_1$ is received through the interface of the system from the device, media source, or node. The original file $774_1$ is associated with metadata, which, for example, may be generated by a user, the device, and/or the system processor, either manually or automatically. The metadata may be included in the first block $778_1$ in association with the original file $774_1$.

The value $776_1$ in the genesis block is an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:
  1) SHA-2 computed hash value for the original file
  2) originating device ID
  3) starting timestamp for the original file
  4) initial storage location of the original file
  5) blockchain network member ID for software to currently control the original file and associated metadata The other blocks $778_2$ to $778_N$ in the blockchain also have headers, files, and values. However, unlike the first block $772_1$, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
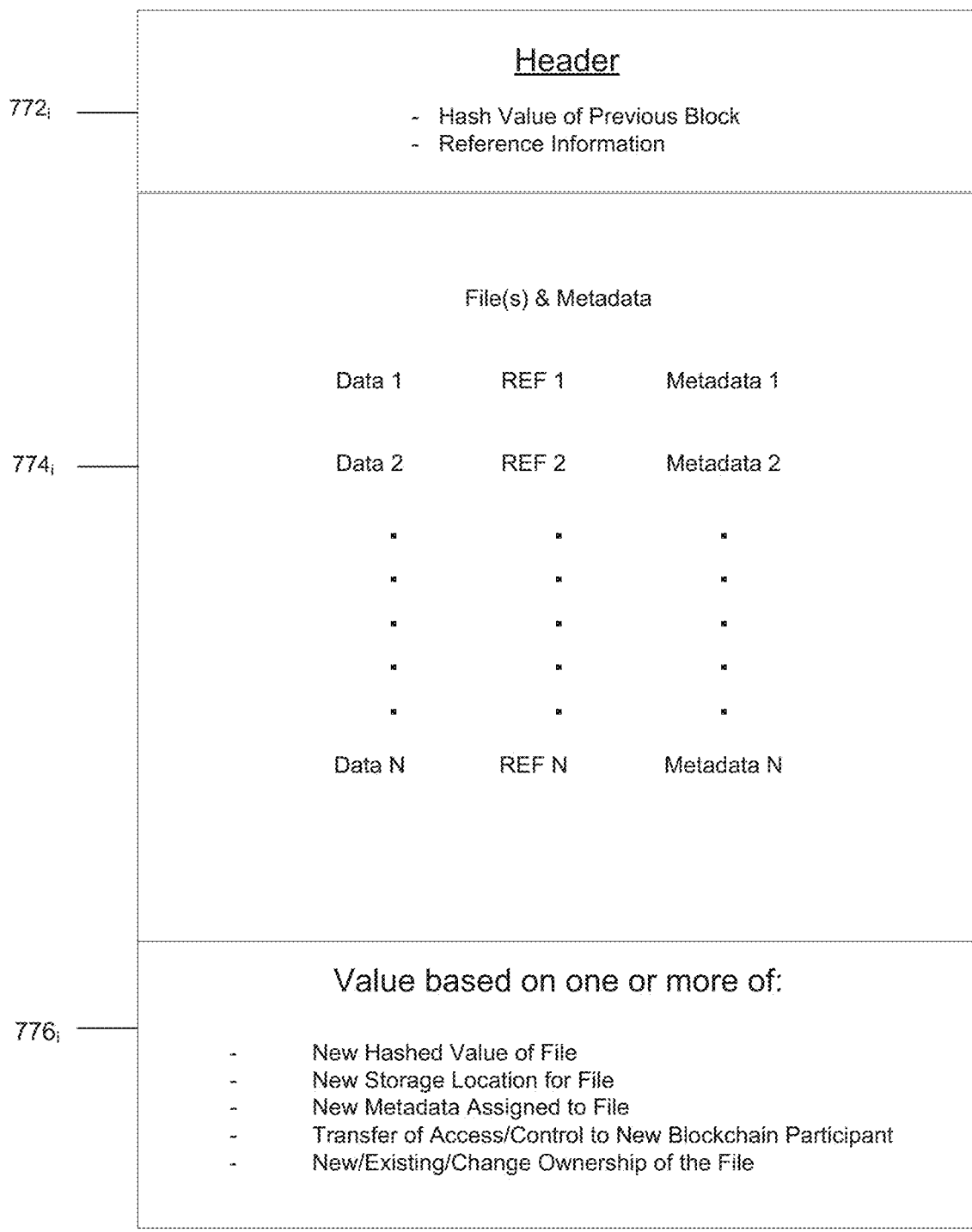
FIG. 7D illustrates a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 7D illustrates an embodiment of a block which may represent the structure of the blocks in the blockchain 790 in accordance with one embodiment. The block, $Block_i$, includes a header $772_i$, a file $774_i$, and a value $776_i$.

The header $772_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $774_i$ includes a plurality of data, such as Data 1, Data 2, . . . , Data N in sequence. The data is tagged with metadata Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $776_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8A:
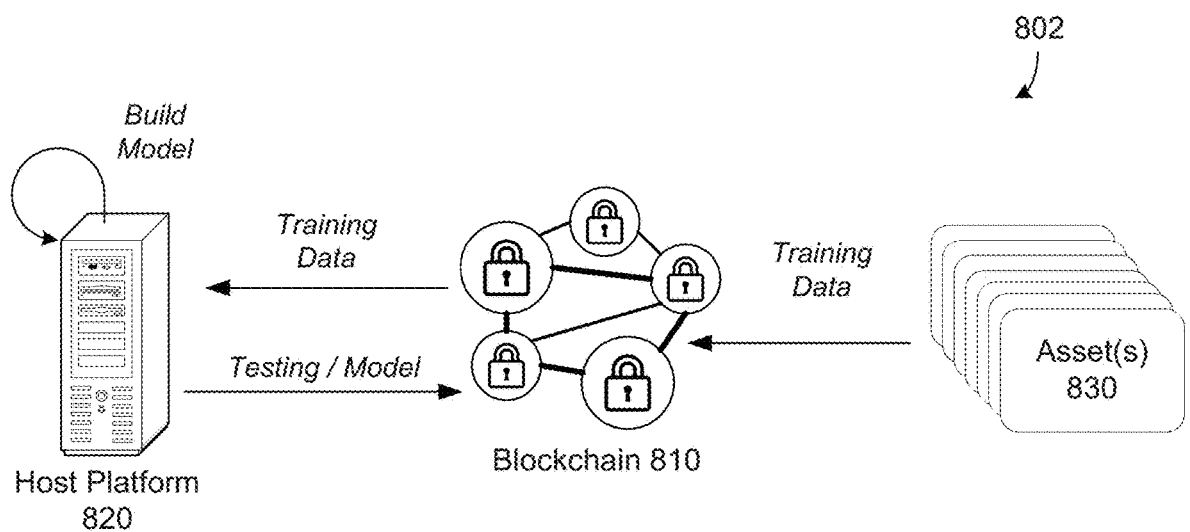
FIG. 8A illustrates an example blockchain which stores machine learning (artificial intelligence) data, according to example embodiments.
Figure 8A:
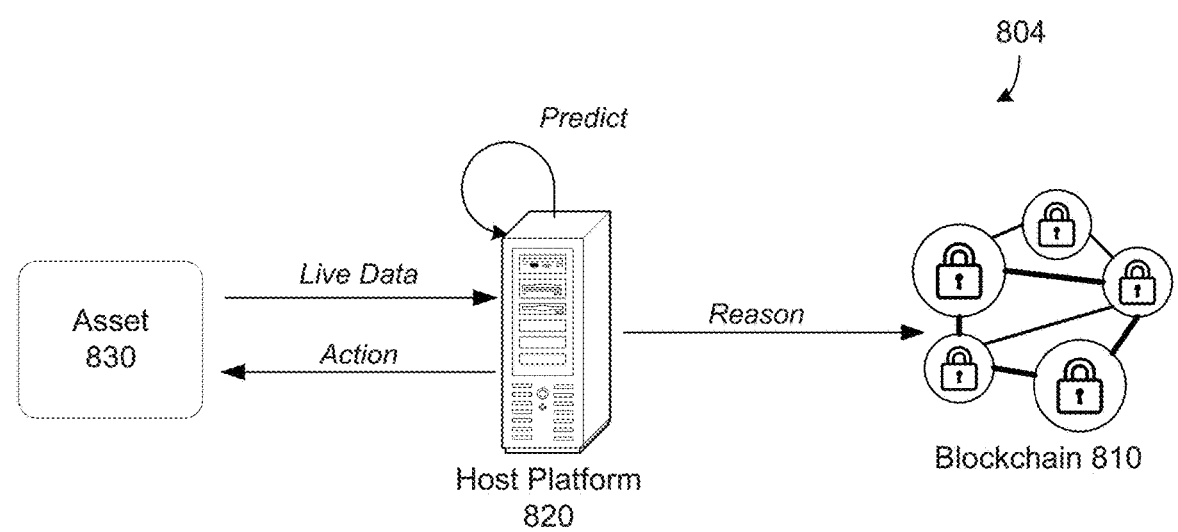
Figure 8B:
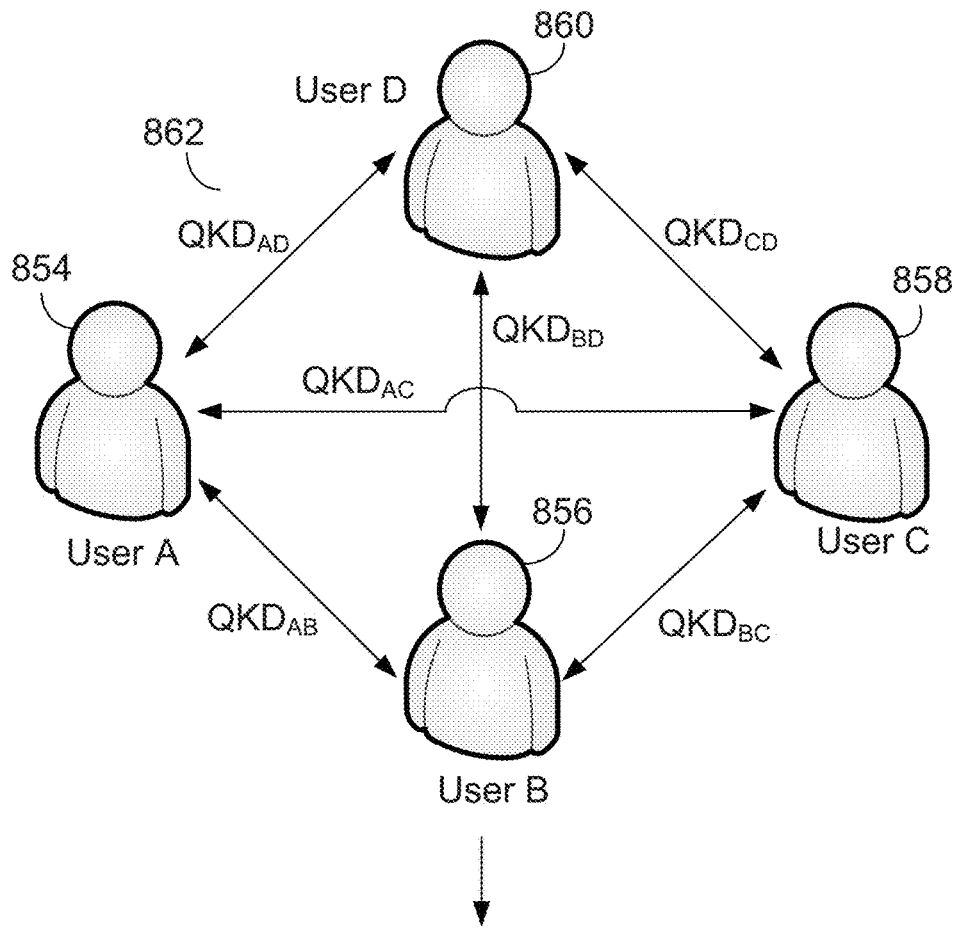
FIG. 8B illustrates an example quantum-secure blockchain, according to example embodiments.

FIGS. 8A and 8B illustrate additional examples of use cases for blockchain which may be incorporated and used herein. In particular, FIG. 8A illustrates an example 800 of a blockchain 810 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 8A, a host platform 820 builds and deploys a machine learning model for predictive monitoring of assets 830. Here, the host platform 820 may be a cloud platform, an industrial server, a web server, a personal computer, a user device, and the like. Assets 830 can be any type of asset (e.g., machine or equipment, etc.) such as an aircraft, locomotive, turbine, medical machinery and equipment, oil and gas equipment, boats, ships, vehicles, and the like. As another example, assets 830 may be non-tangible assets such as stocks, currency, digital coins, insurance, or the like.

The blockchain 810 can be used to significantly improve both a training process 802 of the machine learning model and a predictive process 804 based on a trained machine learning model. For example, in 802, rather than requiring a data scientist/engineer or other user to collect the data, historical data may be stored by the assets 830 themselves (or through an intermediary, not shown) on the blockchain 810. This can significantly reduce the collection time needed by the host platform 820 when performing predictive model training. For example, using smart contracts, data can be directly and reliably transferred straight from its place of origin to the blockchain 810. By using the blockchain 810 to ensure the security and ownership of the collected data, smart contracts may directly send the data from the assets to the individuals that use the data for building a machine learning model. This allows for sharing of data among the assets 830.

The collected data may be stored in the blockchain 810 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices which write directly to the blockchain can, in certain cases (i.e. supply chain, healthcare, logistics, etc.), increase both the frequency and accuracy of the data being recorded.

Furthermore, training of the machine learning model on the collected data may take rounds of refinement and testing by the host platform 820. Each round may be based on additional data or data that was not previously considered to help expand the knowledge of the machine learning model. In 802, the different training and testing steps (and the data associated therewith) may be stored on the blockchain 810 by the host platform 820. Each refinement of the machine learning model (e.g., changes in variables, weights, etc.) may be stored on the blockchain 810. This provides verifiable proof of how the model was trained and what data was used to train the model. Furthermore, when the host platform 820 has achieved a finally trained model, the resulting model may be stored on the blockchain 810.

After the model has been trained, it may be deployed to a live environment where it can make predictions/decisions based on the execution of the final trained machine learning model. For example, in 804, the machine learning model may be used for condition-based maintenance (CBM) for an asset such as an aircraft, a wind turbine, a healthcare machine, and the like. In this example, data fed back from the asset 830 may be input the machine learning model and used to make event predictions such as failure events, error codes, and the like. Determinations made by the execution of the machine learning model at the host platform 820 may be stored on the blockchain 810 to provide auditable/verifiable proof. As one non-limiting example, the machine learning model may predict a future breakdown/failure to a part of the asset 830 and create alert or a notification to replace the part. The data behind this decision may be stored by the host platform 820 on the blockchain 810. In one embodiment the features and/or the actions described and/or depicted herein can occur on or with respect to the blockchain 810.

New transactions for a blockchain can be gathered together into a new block and added to an existing hash value. This is then encrypted to create a new hash for the new block. This is added to the next list of transactions when they are encrypted, and so on. The result is a chain of blocks that each contain the hash values of all preceding blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster (1000s of times faster) and consequently pose a much greater threat.

FIG. 8B illustrates an example 850 of a quantum-secure blockchain 852 which implements quantum key distribution (QKD) to protect against a quantum computing attack. In this example, blockchain users can verify each other's identities using QKD. This sends information using quantum particles such as photons, which cannot be copied by an eavesdropper without destroying them. In this way, a sender and a receiver through the blockchain can be sure of each other's identity.

In the example of FIG. 8B, four users are present 854, 856, 858, and 860. Each of pair of users may share a secret key 862 (i.e., a QKD) between themselves. Since there are four nodes in this example, six pairs of nodes exists, and therefore six different secret keys 862 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the blockchain 852 is based on two procedures (i) creation of transactions, and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 854-860) authenticate the transaction by providing their shared secret key 862 (QKD). This quantum signature can be attached to every transaction making it exceedingly difficult to tamper with. Each node checks their entries with respect to a local copy of the blockchain 852 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction thereby to achieve a Byzantine agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 852. In one embodiment the features and/or the actions described and/or depicted herein can occur on or with respect to the blockchain 852.

Figure 9:
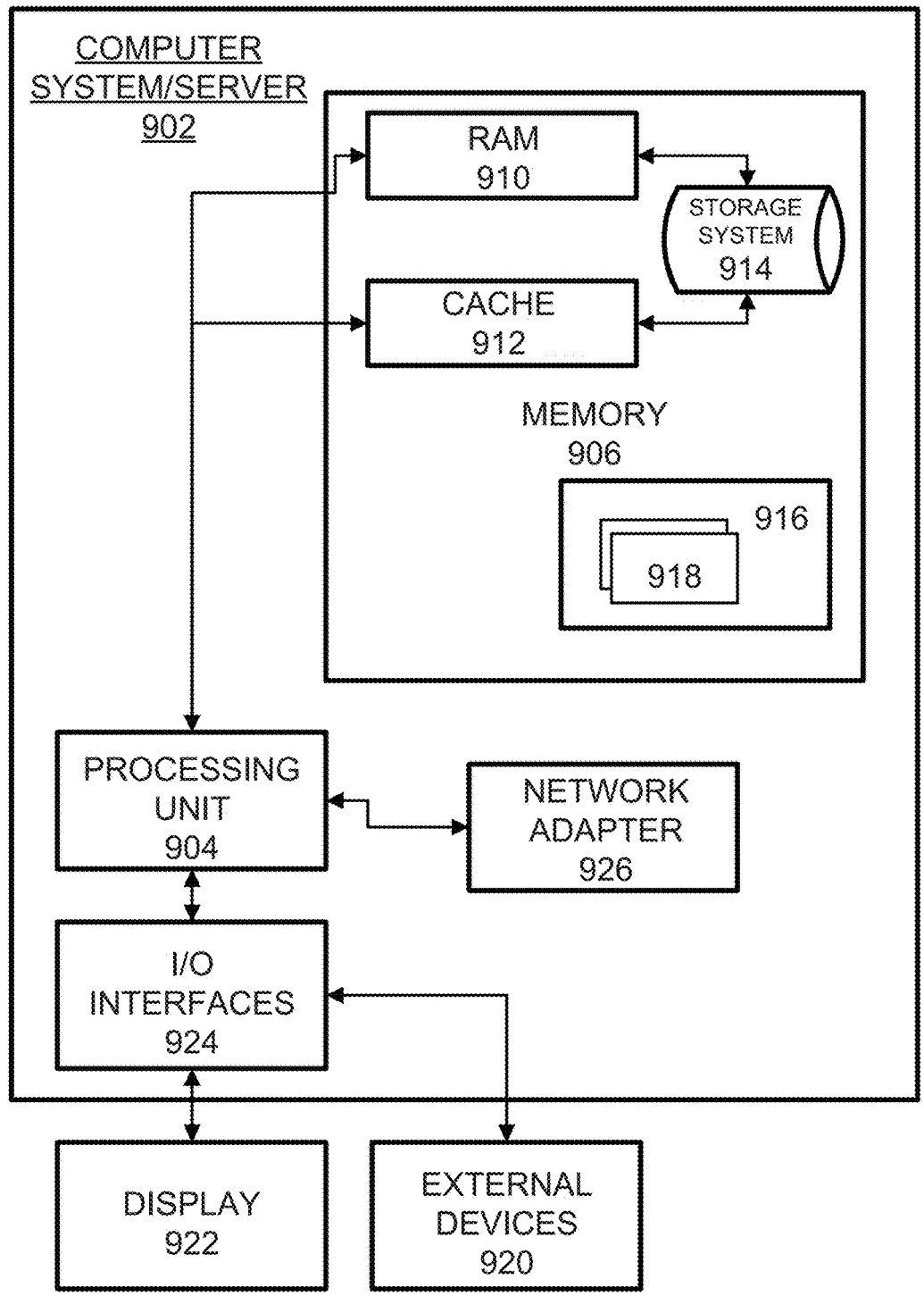
FIG. 9 illustrates an example system that supports one or more of the example embodiments.

FIG. 9 illustrates an example system 900 that supports one or more of the example embodiments described and/or depicted herein. The system 900 comprises a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

In accordance with one or more of the aforementioned embodiments, a system, method, and computer-readable medium are provided that represents an improvement is managing the storage of information in a decentralized database, and more particularly to managing transactions and other event data for a decentralized database, including but not limited to a blockchain.

In one embodiment, one or more of the embodiments solves problems by preventing byzantine clients from inserting valid, but misleadingly formed transactions into the system that appear to emit events corresponding to a particular operation, but which did not perform said operation. In a traditional database, transactions may be safely filtered at ingress by any participant, because there is an assumption of trust in any validating node. In contrast, in accordance with one or more embodiments, because different participants may have different authorities and/or different states that require different endorsements to modify them, these one or more embodiments cannot operate under a traditional database.

Moreover, one or more embodiments described herein improve the security of the client applications by eliminating an attack surface (spoofed events on otherwise valid transactions). Additionally, one or more embodiments may store and manage a new type of data in a decentralized database. For example, new data may be stored inside the transaction which encapsulates an event. This additional data may be utilized by the transaction validation component to perform more validation checks than would otherwise be required to validate the transaction. This additional data is then consumed by the client, who is now able to process the event with safety, since if the transaction was marked valid, then the client knows that these additional security checks were performed.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A node in a blockchain network, the node comprising:
a processor that when executing one or more instructions stored in an associated memory is configured to:
receive data from another node in the blockchain network, the data identifying a context of an object managed by a blockchain of the blockchain network,
validate the data based on an endorsement policy,
receive an identifier for the object,
generate an event comprising a first field for data associated with the event, a second field dedicated to the validation of the event, and a third field containing information associated with a transaction associated with the event,
execute a pseudo-write operation to store the identifier only in the second field, wherein the identifier links the event to the object,
automatically validate the event based on a pre-authorization assigned to the identifier for the object from an authority of the blockchain network without querying other peer nodes in the blockchain network, and
submit the event to the blockchain for consensus processing.

2. The node of claim 1, wherein the identifier comprises key information previously validated for the object.

3. The node of claim 2, wherein the key information links the event to a validation authority that validates the event based on the key information.

4. The node of claim 1, wherein the context comprises a tuple including at least two of:
a channel name, a namespace, a collection, or a key name corresponding the blockchain.

5. The node of claim 1, wherein the presence of the key information in the identifier causes a second node in the blockchain network to automatically validate the event based on the presence of the key information without checking ledgers of other nodes in the blockchain network.

6. The node of claim 1, wherein the data has a format including a plurality of data fields, and wherein, when the processor is configured to generate the event, the processor is further configured to:
add a new data field storing the key information to the format.

7. The node of claim 1, wherein the data indicates a change in a state of the object.

8. A method, comprising:
receiving, by node in a blockchain network, data from another node in the blockchain network, the data identifying a context of an object managed by a blockchain of the blockchain network;
validating, by the node, the data based on an endorsement policy;
receiving, by the node, an identifier for the object;
generating, by the node, an event comprising a first field for data associated with the event, a second field dedicated to the validation of the event, and a third field containing information associated with a transaction associated with the event;
executing, by the node, a pseudo-write operation to store the identifier only in the second field, wherein the identifier links the event to the object;
automatically validating, by the node, the event based on a pre-authorization assigned to the identifier for the object from an authority of the blockchain network without querying other peer nodes in the blockchain network; and
submitting, by the node, the event to the blockchain for consensus processing.

9. The method of claim 8, wherein the identifier comprises key information previously validated for the object.

10. The method of claim 9, wherein the key information links the event to a validation authority that validates the event based on the key information.

11. The method of claim 8, wherein the context comprises a tuple including at least two of:
a channel name, a namespace, a collection, or a key name corresponding the blockchain.

12. The method of claim 8, wherein the presence of the key information in the identifier causes a second node in the blockchain network to automatically validate the event based on the presence of the key information without checking ledgers of other nodes in the blockchain network.

13. The method of claim 8, wherein the data has a format including a plurality of data fields, and wherein the generating the event further comprises:
adding a new data field storing the key information to the format.

14. The method of claim 8, wherein the data indicates a change in a state of the object.

15. A non-transitory computer-readable medium storing one or more instructions that when executed by a processor of a node in a blockchain network configure the processor to:
receive data from another node in the blockchain network, the data identifying a context of an object managed by a blockchain of the blockchain network;
validate the data based on an endorsement policy;
receive an identifier for the object;
generate an event comprising a first field for data associated with the event, a second field dedicated to the validation of the event, and a third field containing information associated with a transaction associated with the event;
execute a pseudo-write operation to store the identifier only in the second field, wherein the identifier links the event to the object;
automatically validate the event based on a pre-authorization assigned to the identifier for the object from an authority of the blockchain network without querying other peer nodes in the blockchain network; and
submit the event to the blockchain for consensus processing.

16. The medium of claim 15, wherein the identifier comprises key information previously validated for the object.

17. The medium of claim 16, wherein the key information links the event to a validation authority that validates the event based on the key information.

18. The medium of claim 15, wherein the context comprises a tuple including at least two of:
a channel name, a namespace, a collection, or a key name corresponding the blockchain.

19. The medium of claim 15, wherein the data has a format including a plurality of data fields, and wherein, when the processor is configured to generate the event, the one or more instructions further configure the processor is further configured to:
add a new data field storing the key information to the format.

20. The medium of claim 15, wherein the presence of the key information in the identifier causes a second node in the blockchain network to automatically validate the event based on the presence of the key information without checking ledgers of other nodes in the blockchain network.

* * * * *